UNITED STATES PATENT OFFICE.

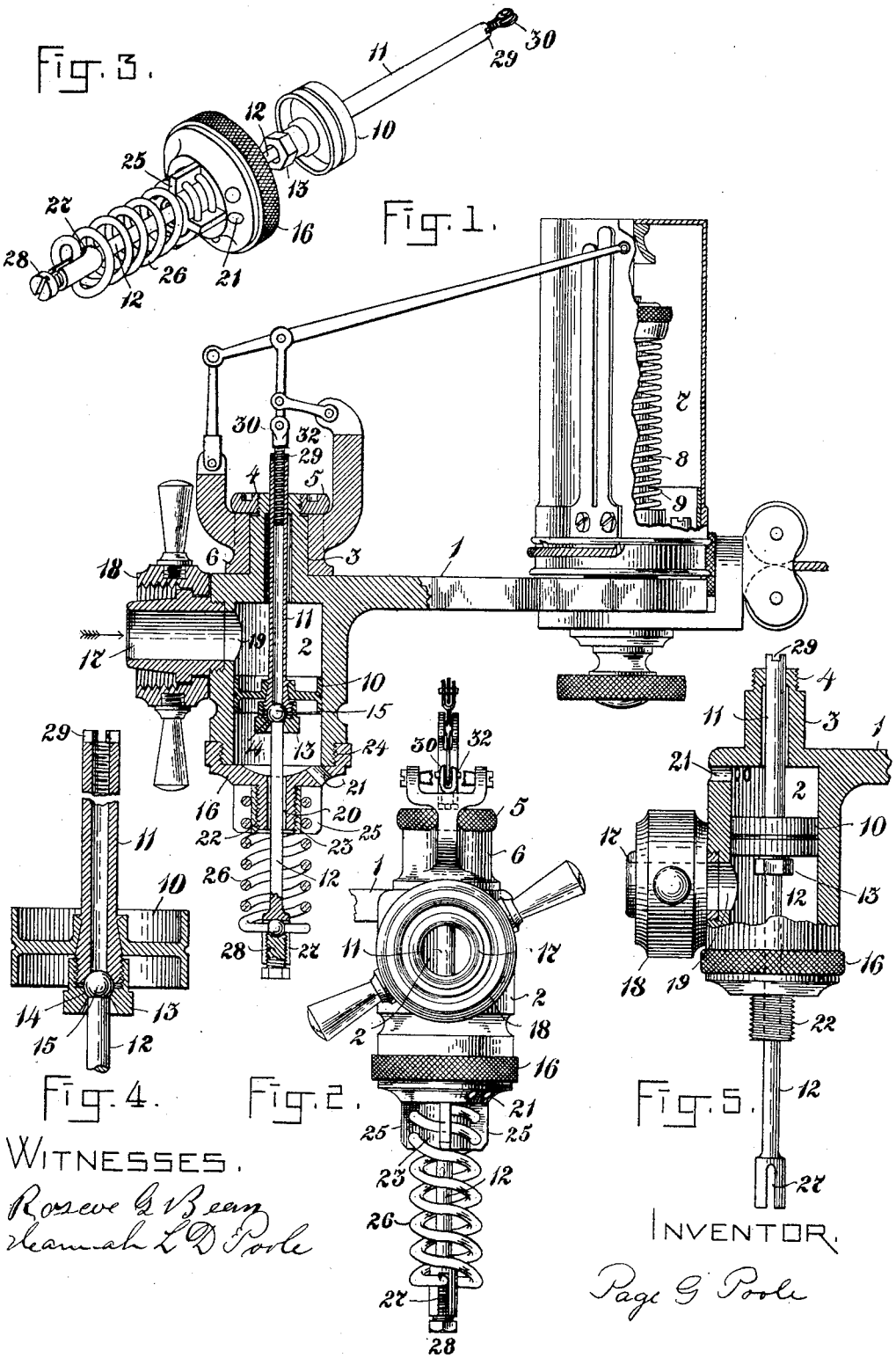

PAGE G. POOLE, OF EVERETT, MASSACHUSETTS.

STEAM-ENGINE INDICATOR.

SPECIFICATION forming part of Letters Patent No. 633,532, dated September 19, 1899.

Application filed December 10, 1898. Serial No. 698,924. (No model.)

*To all whom it may concern:*

Be it known that I, PAGE G. POOLE, a citizen of the United States, residing at the city of Everett, in the county of Middlesex and State of Massachusetts, have invented certain new and useful Improvements in Steam-Engine Indicators, of which the following is a specification.

Referring to the drawings, Figure 1 is a sectional elevation of my improved engine-indicator, parts being shown in their normal position. Fig. 2 is a partial view of the same looking at the rear, the spring being extended. Fig. 3 is a perspective view of the removable parts. Fig. 4 is an enlarged sectional detail to be hereinafter referred to. Fig. 5 is a modification of this invention.

My invention has for its object to provide an engine-indicator with the least number of parts, thereby reducing the cost of manufacture and simplifying the construction, to reduce the weights of all movable parts to a minimum consistent with strength, to provide an adjustment for the pencil-movement without interfering with other parts, and to place the spring in a position which will render it more convenient for removal, free in its action, accessible at all times, and less liable to distortion than is possible when under the direct influence of steam and a variable temperature within the piston-cylinder, and such details of construction as are more fully described hereinafter to accomplish the best results.

I make no claim to the kind of pencil-movement herein shown or means for reciprocating the drum or paper-cylinder, as any well-known mechanism may be employed without departing from the spirit of my invention, neither do I claim any special kind of spring.

In the drawings, 1 represents the drum plate or support cast integral with the steam or piston cylinder 2, having a vertically-projecting hub 3, threaded at 4 to receive a nut 5, which retains a sleeve 6 in position on the hub 3 and permits of the pencil-movement, to which it is attached, being swiveled toward or from the drum 7 when it becomes necessary to remove or place a card on the same.

The drum 7 is free to reciprocate on an arbor 8 and is returned to its normal position by a spring 9, thus keeping a tension on the cord, which in turn is connected with some oscillating or reciprocating part of an engine, preferably the cross-head. The nut 5 also serves to lock the pencil-movement in a fixed position, if necessary—for instance, when the operator wants to make a heavy line on the diagram.

Within the cylinder 2 is a piston 10, having a suitable guiding cylindrical bearing and hub which connects with two piston-rods 11 and 12. By means of a nut 13, concaved at 14 to receive the ball terminal 15 on the rod 12, (shown in Figs. 1 and 4,) the two piston-rods are connected with each other, the nut coinciding with a threaded shank on the end of the piston-rod 11 contiguous to the piston 10, the hub of the latter being bored to receive the conical enlarged portion of the rod 11 and to which it is permanently fixed in a manner shown in the drawings, Figs. 1 and 4—in this instance staked on. The rod 11 is tubular and is concaved or recessed to more completely form a perfect ball-and-socket or universal joint. It will readily be seen that by such construction the spring has perfect freedom in its action without any liability of buckling or cramping, and by the removable cap 16, located at the bottom of the piston-cylinder, being bored of a much larger diameter at 20 than that of the piston-rod any strains here would not affect it.

The piston-cylinder is bored to a sliding fit through the hub 3 to keep the piston-rod 11 in central alinement with the interior at all times, thus insuring the best possible results and reducing friction to a minimum.

In one side of the steam or piston cylinder 2 is threaded a conical tailpiece 17, set at right angles to the bore of the cylinder and having a coupling 18, which may be readily attached to any elbow or cock by the operator. The conical tailpiece 17 is in line with an inlet-port 19, through which the steam enters the cylinder 2.

For the convenience of lubrication, cleaning, and repairing when necessary the lower end of the piston-cylinder consists of a removable cap 16, previously referred to, which is here shown having exhaust-ports 21 to relieve the cylinder during the operation of the instrument; but the location of these would be governed wholly by the location of the inlet-port and would necessarily be on the side of the piston opposite thereto. The cap 16 is threaded at 24 and projects over the outside of the piston-cylinder to permit of a better grip being taken when necessary to remove it without fear of distorting the cylinder. Extending downwardly from the center of the cap 16 is a threaded hub 22, which coincides with a sleeve 23, having wings 25, to which one end of the spring 26 is attached, the other end passing through slots 27, that are cut transversely in the end of the piston 12, and is retained in place by a set-screw 28, which is concaved on its inner end to fit over the spring, and thus form a second universal joint.

For the purpose of adjusting the pencil-movement to an atmospheric line the piston 10 and rod 11 are turned in a rotary direction by a wrench that fits into the notches 29, that are formed in the outer end of the rod 11, and this movement will cause the screw 30, that pivotally connects with the pencil-movement at 32, to be raised or lowered according to the direction it may be turned through the medium of coinciding screw-threads.

Should it become necessary to oil the piston and its connecting parts to insure their proper working or previous to such times as the indicator is to be out of use, it will be observed that by unscrewing the cap 16 from the piston-cylinder and disconnecting the screw 30 from the pencil-movement the entire working mechanism of the piston may be removed without displacing any of the parts, and to more clearly illustrate this feature the perspective drawing, Fig. 3, is shown. This is more easily accomplished because of the kind of connection the piston-rod 12 has with the spring and piston, and another consideration is in the fact that the parts singly and collectively may be better examined and more easily separated from each other when outside or removed from the cylinder.

By the piston 10 being rigidly fixed to the piston-rod 11 any liability of these two parts getting out of alinement is prevented.

Having described the several parts that enter into the construction of my invention, I will briefly explain the operation of the instrument and its functions.

The piston being of a carefully-determined area is nicely fitted into the piston-cylinder so that it may move up and down without sensible friction. The cylinder is open at the side and fitted so that it may be attached to pipes leading from the cylinder of a steam-engine and have free communication with its interior, by which arrangement the upper side of the piston is subjected to all the varying pressures of the steam acting therein. The downward movement of the piston, due to the pressure of the steam, is resisted by the spring outside the cylinder and connected to a piston-rod, the spring being of a known elastic force. A piston-rod projects upwardly through the cylinder and moves a lever, having at its free end a lever which carries a pencil-point whose vertical movement bears a constant ratio to that of the piston—in this case six to one. A drum of cylindrical form and covered with paper is attached to the piston-cylinder in such a manner that the pencil-point may be brought in contact with its surface and locked in such a position, thus recording any movement of either the paper or drum and pencil. The drum is given a horizontal motion coincident with and bearing a constant ratio to the movement of the piston of the engine. It is moved in one direction by means of a cord attached to the cross-head and in the opposite direction by a spring within itself. When this mechanism is properly adjusted and free communication is opened with the cylinder of a steam-engine in motion, it is evident that the pencil will be moved vertically by the varying pressure of steam on top of the piston, and as the drum is rotated by the reciprocating motion of the engine if the pencil is held in contact with the moving paper during one revolution of the engine a figure or diagram will be drawn representing the pressure of steam in the cylinder, the lower line showing the pressure urging the piston forward and the upper the pressure retarding its movement on the return stroke.

To enable an engineer to more correctly interpret the nature of the pressures, the line showing the atmospheric pressure is drawn, which indicates whether the pressure at any point is greater or less than that of the atmosphere. From such a diagram may be deduced many particulars which are of supreme importance to engine-builders, engineers, and the owners of steam plants, among which may be the following: The arrangement of the valves for admission, cut off, release, and compression of steam; the adequacy of the ports and passages for admission and exhaust and when applied to the steam-chest the adequacy of the steam-pipes; the suitableness of the valve motion in point of rapidity at the right time; the quantity of power developed in the cylinder and the quantity lost in various ways—by wiredrawing, by back pressure, by premature release, by maladjustment of valves, leakage, &c. It is useful to the designers of steam-engines in showing the distribution of horizontal pressures at the crank-pin through the momentum and inertia of the reciprocating parts and the angular distribution of the tangential component of the horizontal pressure—in other words, the rotative effect around the path of the crank.

Taken in combination with measurements of feed-water and the condensation and measurement of the exhaust-steam with the amount of fuel used the indicator furnishes many other items of importance when the economical generation and use of steam are considered. For every one of these purposes it is important that the diagram made by the indicator should truly represent the path of the piston and the pressure exerted on both sides of the piston at every point of that path. To this end has my invention been designed with a view to their successful accomplishment.

What I claim, and desire to secure by Letters Patent, is—

1. In an indicator the combination of a piston, piston-rod adjustable to a diagram-tracing pencil-movement, a piston-cylinder having an inlet and exhaust ports, interposed between a spring and pencil-movement, a second piston-rod connected at its outer end with a spring that is held on the outside of the piston-cylinder below the piston to resist the pressure exerted thereon, and a diagram-carrying mechanism for the purpose specified as set forth.

2. In an indicator the combination of a piston, a piston-rod adjustable to a diagram-tracing pencil-movement in alinement with the center of the piston, a piston-cylinder interposed between a spring and a pencil-movement, a second piston-rod connected at one end with the spring which is secured to the end of the cylinder and at its opposite end connected to the piston to resist the pressure exerted thereon, said spring being located below the piston outside the steam-chamber, for the purpose specified as set forth.

3. In an indicator the combination of a piston, a piston-rod adjustable to a diagram-tracing pencil-movement in alinement with the center of the piston and permitting the pencil-movement to swivel in a direction toward or from a diagram, a piston-cylinder interposed between a spring and the pencil-movement and having inlet and exhaust ports, a second piston-rod connected at one end with the piston and at the other end to a spring, said spring being secured to the piston-cylinder below the piston to resist the pressure exerted thereon, and a diagram-carrying mechanism for the purpose specified as set forth.

4. In an indicator the combination of a piston, a piston-rod adjustable to a diagram-tracing pencil-movement in alinement with the center of the piston and cylinder permitting the pencil-movement to swivel toward or from the diagram, a nut adapted to lock the pencil-movement in a fixed position, a piston-cylinder interposed between a spring and a pencil-movement and having inlet and exhaust ports, a second piston-rod connected at one end with the piston and at the opposite end to a spring which is secured to the lower end of the piston-cylinder outside the steam-chamber, and beneath the piston to resist the pressure exerted thereon, and a diagram-carrying mechanism, for the purpose specified as set forth.

5. In an indicator the combination of a piston, a piston-rod adjustable to a diagram-tracing pencil-movement in alinement with the center of the piston and cylinder permitting the pencil-movement to swivel in a direction toward or from a diagram, a nut adapted to lock the pencil-movement in a fixed position with relation to the diagram and holding it in place on a hub formed on the upper side of the piston-cylinder, said cylinder being interposed between a spring and the pencil-movement, and having inlet and exhaust ports and a second piston-rod having a universal-joint connection with the piston and upper rod the other end being connected to a spring, said spring being secured to the piston-cylinder outside of the same beneath the piston to resist the pressure exerted thereon, and a diagram-carrying mechanism for the purpose specified as set forth.

6. In an indicator the combination of a piston, piston-rods connected with the piston a diagram-tracing pencil-movement and a spring, a piston-cylinder interposed between said pencil-movement and spring and having inlet and exhaust ports, a pencil-movement mounted on the top thereof and adapted to swivel toward or from a diagram-carrying drum and operating mechanism for reciprocating the same in a rotary direction on a supporting-arm, a spring located outside the steam-cylinder beneath the piston to resist the pressure exerted thereon and adapted to be removed from the same without interfering or changing the position of other operating mechanism, for the purpose specified as set forth.

7. In an indicator the combination of a piston, a piston-rod for the purpose of imparting motion to a diagram-tracing pencil-movement extending outward and upward through a piston-cylinder and in alinement with the center thereof, a second piston-rod having a universal-joint connection at the end contiguous to the piston, and secured to a spring at its opposite end said spring being located outside of the steam-chamber beneath the piston to resist the pressure exerted thereon and opposite to the pencil-movement, said cylinder having inlet and exhaust ports and a removable cap over its lower end, to which the spring is secured and adapted to be removed therefrom without interfering with, or removing the other working parts, and a diagram-carrying mechanism that reciprocates rotatively, for the purpose specified as set forth.

8. In an indicator the combination with a piston, a tubular piston-rod fixed thereto and attached to a diagram-tracing pencil-movement on its upper end said piston and rod adapted to turn and thereby adjust the pencil-movement upward or downward in alinement with the center of the piston, a second piston-rod secured by a nut to the upper rod, said nut having a concavity and conical aperture to receive one end of the piston and hold it contiguous to the piston, the rod being slotted at its outer end and having an internal threaded portion to hold a screw which clamps a spring in place, said spring being held on the opposite end by an internally-threaded sleeve coinciding with a threaded hub formed on a removable cap of the piston-cylinder whereby the spring will resist any pressure exerted on the piston said cylinder being provided with inlet and exhaust ports and located between the spring and pencil-movement, an arm extending horizontally therefrom and supporting a reciprocating diagram-carrying drum, for the purpose specified as set forth.

9. In an indicator the combination of a piston, a tubular piston-rod concaved at the lower end and rigidly fixed to the piston, having a threaded portion at its upper end for the reception of a screw that coincides therewith said screw being attached to the diagram-tracing-pencil-carrying mechanism that is mounted on a sleeve bearing on the upper end of a piston-cylinder on which the sleeve is normally free to swivel, secured by a nut adapted to lock the same in a fixed position, an aperture in a hub formed on the upper end of the piston-cylinder to guide the piston-rod in alinement with the center of the piston-cylinder, a second piston-rod with a spherical bearing on one end, a nut having a concavity and conical depression for the reception of the same and serving to hold said rod contiguous to the piston so as to form a universal joint, slotted at its opposite end and threaded to hold a screw which clamps one end of a spring thereto, the opposite end of said spring being held in wings formed on an internally-threaded hub which coincides with a threaded hub formed on the removable cap of the piston-cylinder whereby the spring will resist any pressure exerted on the piston and may be removed without interfering with any other parts and a cylinder having inlet and exhaust ports, and a support for a reciprocating diagram-carrying mechanism, for the purpose specified as set forth.

In testimony whereof I have affixed my signature in presence of two witnesses.

PAGE G. POOLE.

Witnesses:
ROSEY G. BEAR,
HANNAH L. D. POOLE.